United States Patent
Kobayashi et al.

(10) Patent No.: US 8,172,689 B2
(45) Date of Patent: May 8, 2012

(54) FIXED-TYPE CONSTANT VELOCITY UNIVERSAL JOINT

(75) Inventors: Tomoshige Kobayashi, Iwata (JP); Teruaki Fujio, Iwata (JP); Hisaaki Kura, Iwata (JP); Shin Tomogami, Iwata (JP); Takeshi Kohara, Iwata (JP)

(73) Assignee: NTN Corporation, Osaka (JP)

( * ) Notice: Subject to any disclaimer, the term of this patent is extended or adjusted under 35 U.S.C. 154(b) by 330 days.

(21) Appl. No.: 12/523,094

(22) PCT Filed: Jan. 7, 2008

(86) PCT No.: PCT/JP2008/050047
§ 371 (c)(1),
(2), (4) Date: Jul. 14, 2009

(87) PCT Pub. No.: WO2008/096558
PCT Pub. Date: Aug. 14, 2008

(65) Prior Publication Data
US 2010/0099504 A1 Apr. 22, 2010

(30) Foreign Application Priority Data
Feb. 2, 2007 (JP) ................. 2007-024426

(51) Int. Cl.
*F16D 3/224* (2011.01)
(52) U.S. Cl. .................................... 464/15; 464/906
(58) Field of Classification Search ............ 464/15, 464/140–146, 906
See application file for complete search history.

(56) References Cited

U.S. PATENT DOCUMENTS

| 6,736,729 B2 * | 5/2004 | Wang et al. ............ 464/15 |
| 7,094,155 B2 | 8/2006 | Hosoya et al. |
| 2002/0077186 A1 | 6/2002 | Hosoya et al. |

(Continued)

FOREIGN PATENT DOCUMENTS
JP 08-128454 5/1996
(Continued)

OTHER PUBLICATIONS

Miller et al, "Rzeppa Universal Joint", Universal Joint and Driveshaft Design Manual, AE-7, Society of Automotive Engineers, Inc., Warrendale, PA, pp. 145-150, TJ1079.562 1979.*

(Continued)

*Primary Examiner* — Gregory Binda
(74) *Attorney, Agent, or Firm* — Wenderoth, Lind & Ponack, L.L.P.

(57) ABSTRACT

A fixed-type constant velocity universal joint can sufficiently interpose a lubricant between a torque transmitting ball and a guide groove, and reduce frictional force. The fixed-type constant velocity universal joint of the present invention includes an outer joint member 1 that is filled with a lubricant and on which a guide groove 1b that extends in an axial direction is formed on a spherical inner circumferential surface 1a, an inner joint member 2 provided on an inner diameter side of the outer joint member 1 and on which a guide groove 2b that extends in the axial direction is formed on a spherical outer circumferential surface 2a, a torque transmitting ball 3 interposed between opposing guide grooves 1b and 2b of the outer joint member 1 and the inner joint member 2 such as to roll freely, and a cage 4 that holds each ball 3. Numerous miniscule recesses are randomly formed on a surface of the ball 3.

6 Claims, 10 Drawing Sheets

U.S. PATENT DOCUMENTS

2003/0017877 A1* 1/2003 Kobayashi et al. ............ 464/145
2005/0020456 A1 1/2005 Kawamura et al.

FOREIGN PATENT DOCUMENTS

| | | |
|---|---|---|
| JP | 09-317784 | 12/1997 |
| JP | 3460107 | 4/1998 |
| JP | 2001-183124 | 7/2001 |
| JP | 2002-188653 | 7/2002 |
| JP | 2005-8745 | 1/2005 |
| JP | 2006-258207 | 9/2006 |
| JP | 2006-283830 | 10/2006 |
| JP | 2007-016851 | 1/2007 |

OTHER PUBLICATIONS

National Lubricant Grease Institute (NLGI) Grease Classification System, TOTAL Lubricants USA Southwest, LLC, 2010. [filed by applicant Nov. 7, 2011.].*

International Preliminary Report on Patentability and Written Opinion of the International Searching Authority dated Aug. 13, 2009 for International Application No. PCT/JP2008/050047.

International Search Report mailed Mar. 4, 2008 for International Application No. PCT/JP2008/050047.

* cited by examiner

FIXED-TYPE CONSTANT VELOCITY UNIVERSAL JOINT

TECHNICAL FIELD

The present invention relates to a fixed-type constant velocity universal joint used in automobiles and various industrial machineries. In particular, the present invention relates to a fixed-type constant velocity universal joint that uses a ball as a torque transmitting element.

BACKGROUND ART

In automobiles and various similar vehicles, a constant velocity universal joint is provided on a power transmission path used to transmit driving force from the engine to the wheels. The constant velocity universal joint is capable of transmitting rotational force at a constant speed even when angular displacement and axial displacement occur between two axes.

As shown in FIG. 8A, basic constituent elements of the constant velocity universal joint include an outer joint member 101, an inner joint member 102, a plurality of torque transmitting balls 103, and a cage 104. A plurality of guide grooves 101b are formed on a spherical inner circumferential surface 101a of the outer joint member 101. A plurality of guide grooves 102b are formed on a spherical outer circumferential surface 102a of the inner joint member 102. The torque transmitting balls 103 are disposed on ball tracks formed by opposing guide grooves 101b of the outer joint member 101 and guide grooves 102b of the inner joint member 102. The cage 104 is interposed between the outer joint member 101 and the inner joint member 102, and holds the torque transmitting balls 103. The joint is a fixed-type constant velocity universal joint that does not make plunging movements. A joint center O is fixed regardless of an operation angle. In this instance, six torque transmitting balls 103 are disposed evenly spaced in a circumferential direction.

A center of curvature of the inner circumferential surface 101a of the outer joint member 101 and a center of curvature of the outer circumferential surface 102a of the inner joint member 102 are both aligned with the joint center O. On the other hand, a center of curvature $O_{101}$ of the guide groove 101b of the outer joint member 101 and a center of curvature $O_{102}$ of the guide groove 102b of the inner joint member 102 are offset by equal distances $F_1$ and $F_2$ in opposite directions in an axial direction with the joint center O therebetween (in the example shown in FIG. 8A, the center $O_{101}$ is closer to a joint opening-end side, and the center $O_{102}$ is closer to a joint closed-end side). Therefore, a ball track formed by a guide groove 101b and a guide groove 102b that oppose each other is formed into a wedge shape that becomes wider in either axial direction.

When torque is transmitted while the joint is at an operating angle, a thrust force M is generated that attempts to push the ball 103 from the narrow portion of the wedge-shaped ball track to the wide portion, as shown in FIG. 8B. As a result, inner and outer circumferential surfaces of the cage 104 press against the inner circumferential surface 101a of the outer joint member 101 and the outer circumferential surface 102a of the inner joint member 102. Friction generated at this time causes rotational torque loss. Magnitude of the thrust force M corresponds to a size of an angle of nip γ that is formed by two tangential lines in the axial direction of the ball 103 in relation to the guide groove 101b and the guide groove 102b. In other words, the thrust force M increases as the angle of nip γ increases.

A joint including eight torque transmitting balls (refer to, for example, Patent Document 1 and Patent Document 2) is known as a joint that is more compact and has higher torque transmitting efficiency than the joint including six torque transmitting balls 103 shown in FIG. 8A. Constituent elements of a constant velocity universal joint including eight balls shown in FIG. 9A are basically similar to those of the constant velocity universal joint shown in FIG. 8A. Sections that are the same are given the same reference numbers. Redundant explanations are omitted. The joint in FIG. 9A has a smaller ball size, and the center of curvature of the guide grooves is offset by a smaller amount, compared to the joint in FIG. 8A.

More specifically, in FIG. 9A, an angle of nip γ' is smaller than the angle of nip γ in FIG. 8A as a result of an offset $F_1'$ of the center of curvature $O_{101}$ and an offset $F_2'$ of the center of curvature $O_{102}$ being smaller than the offset $F_1$ and the offset $F_2$ in FIG. 8A. In other words, as a result of the angle of nip γ' in FIG. 9A being reduced (γ'<γ), thrust force M' shown in FIG. 9B is also reduced. Therefore, friction between the contact surfaces of the cage, the inner joint member, and the outer joint member during torque transmission can be reduced.

FIG. 10 shows a six-ball joint. FIG. 11 shows an eight-ball joint. In FIG. 10, A is a contact point path of the ball 103 in relation to the guide groove 102b on the inner joint member 102. B is a contact point path of the ball 103 in relation to the guide groove 101b of the outer joint member 101. In FIG. 11, A' and B' are contact point paths similar to those in FIG. 10. An example of length ratios of the contact point path A, the contact point path A', the contact point path B, and the contact point B' are shown in Table 1, below, the contact point path A being 1. Respective ball diameter ratios (R:R') and offset ratios (F1:F1' or F2:F2') of the six-ball joint and the eight-ball joint at this time are also shown in Table 1.

TABLE 1

|  | Six-ball joint | Eight-ball joint |
| --- | --- | --- |
| Contact path length ratio in relation to inner joint member | 1.53 (A) | 1 (A') |
| Contact path length ratio in relation to outer joint member | 1.61 (B) | 1.06 (B') |
| Ball diameter ratio | 1.25 (R) | 1 (R') |
| Offset ratio | 1.68 ($F_1$) | 1 ($F_1'$) |

It is clear from Table 1 that the difference between the contact point path of the inner joint member and the contact point path of the outer joint member in the eight-ball joint (B'−A'=0.06) is smaller than the difference between the contact point path of the inner joint member and the contact point path of the outer joint member in the six-ball joint (B−A=41.08). As a result of a configuration such as this, in the eight-ball joint, sliding speed between the ball and the guide groove on the outer joint member decreases, and torque transmitting efficiency improves.

Therefore, in the eight-ball joint, friction generated at the contact surfaces between the cage, the inner joint member, and the outer joint member can be reduced, compared to the six-ball joint. In addition, because sliding between the ball and the guide groove is reduced, torque can be transmitted with high efficiency.

Patent Document 1: Japanese Patent Publication No. 3460107

Patent Document 2: Japanese Patent Laid-open Publication No. Heisei 9-317784

DISCLOSURE OF THE INVENTION

Problems to be Solved by the Invention

The interior of the outer joint member is commonly filled with a lubricant to reduce friction between the torque transmitting balls and the guide grooves, and improve torque transmitting efficiency. However, in the fixed-type constant velocity universal joint configured such as to include the balls and the guide grooves, significant pressure is applied to contact areas between the balls and the guide grooves during joint rotation. Therefore, a lubricant film layer is not easily formed in the contact areas. As a result, sufficient frictional force reduction effect becomes difficult to achieve.

In light of the above-described issues, the present invention provides a fixed-type constant velocity universal joint in which a sufficient amount of lubricant is interposed between torque transmitting balls and guide grooves, thereby reducing frictional force between the balls and the guide grooves.

Means for Solving the Problems

An invention according to a first aspect is a fixed-type constant velocity universal joint including an outer joint member that is filled with a lubricant and on which a guide groove that extends in an axial direction is formed on a spherical inner circumferential surface, an inner joint member provided on an inner diameter side of the outer joint member and on which a guide groove that extends in the axial direction is formed on a spherical outer circumferential surface, a torque transmitting ball interposed between opposing guide grooves of the outer joint member and the inner joint member such as to roll freely, and a cage that holds each ball. Numerous miniscule recesses are randomly formed on a surface of the ball.

The lubricant permeating into the numerous miniscule recesses on the ball surface can be interposed between contact interfaces of the ball and the guide grooves and can form a suitable lubricant film layer, even when pressure is applied between the ball and the guide grooves during joint rotation. As a result, friction generated between the ball and the guide grooves can be reduced.

An invention according to a second aspect is the fixed-type constant velocity universal joint according to the first aspect in which a maximum coefficient of friction of the lubricant is 0.07, As a result of a lubricant such as that described above being used, friction generated between the ball and the guide grooves can be effectively reduced.

An invention according to a third aspect is the fixed-type constant velocity universal joint according to the second aspect in which the lubricant is urea grease, a minimum consistency of the urea grease being No. 0 and a maximum consistency being No. 2.

As a result of urea grease such as that described above being used, friction generated between the ball and the guide grooves can be effectively reduced.

An invention according to a fourth aspect is the fixed-type constant velocity universal joint according to any one of the first to third aspects in which a minimum surface roughness of the ball on which the numerous miniscule recesses are formed is set to Ra 0.03 µm, a maximum surface roughness is set to Ra 0.6 µm, a maximum parameter SK value of the surface roughness of the ball is set to −1.0, a minimum percentage of a total area of the numerous miniscule recesses to a surface area of the ball is set to 10%, and a maximum percentage is set to 40%.

As a result of the configuration, the lubricant can suitably permeate the miniscule recesses on the ball surface and be held therein. The lubricant film layer can be formed by the lubricant between the ball and the guide grooves. As a result, friction generated between the ball and the guide grooves can be effectively reduced.

An invention according to a fifth aspect is the fixed-type constant velocity universal joint according to the fourth aspect in which a minimum surface roughness of the ball on which the numerous miniscule recesses are formed is set to Ra 0.05 µm, a maximum surface roughness is set to Ra 0.15 µm, a minimum parameter SK value is set to −4.9, and a maximum parameter SK value of the surface roughness of the ball is set to −1.0.

As a result of the configuration, friction generated between the ball and the guide grooves can be further reduced.

An invention according to a sixth aspect is the fixed-type constant velocity universal joint according to any one of the first to fifth aspects in which eight guide grooves are respectively formed on the outer joint member and the inner joint member, eight torque transmitting balls are each interposed between opposing guide grooves of the outer joint member and the inner joint member such as to roll freely, and the ball is in angular contact at two points, respectively, with the guide groove of the outer joint member and the guide groove of the inner joint member.

As a result of the configuration, compared to a fixed-type constant velocity universal joint using six balls, a length of a contact path of the ball in relation to the inner joint member and a length of a contact path of the ball in relation to the outer joint member are shortened, thereby reducing friction generated between the ball and the guide grooves.

An invention according to a seventh aspect is the fixed-type constant velocity universal joint according to the sixth aspect in which a minimum contact angle is set to 30 degrees and a maximum contact angle is set to 38 degrees, the contact angle being formed by a straight line passing through a contact point between the ball and the guide groove of the outer joint member and the guide groove of the inner joint member, and a ball center, and a straight line passing through the ball center and a joint center, and a minimum angle of nip is set to 8.5 degrees and a maximum angle of nip is set to 12.5 degrees, the angle of nip being formed by two tangential lines in the axial direction at each contact point between the opposing guide grooves of the outer joint member and the inner joint member and the ball.

As a result of the contact angle between the ball and the guide groove being set as described above, endurance against the ball running onto an edge of the guide groove during high torque input, reduction of sliding between the guide groove on the outer joint member and the ball, and maintaining contact surface pressure that affects rolling fatigue life at a suitable range can be achieved.

Furthermore, as a result of the angle of nip being set as described above, thrust force in the axial direction applied to the ball during torque transmission can be reduced. In accompaniment, contact surface pressure between the cage and the outer and inner joint members can be suppressed, friction can be reduced, and rotational torque loss can be reduced.

Advantage of the Invention

In the fixed-type constant velocity universal joint of the present invention, formation of a lubricant film layer by a lubricant between a torque transmitting ball and a guide groove can be facilitated. As a result, friction between the ball and the guide groove can be reduced, and torque transmitting efficiency can be improved. Moreover, rolling fatigue life of the ball and the guide groove can be extended.

DETAILED DESCRIPTION OF THE INVENTION

Figure 1:
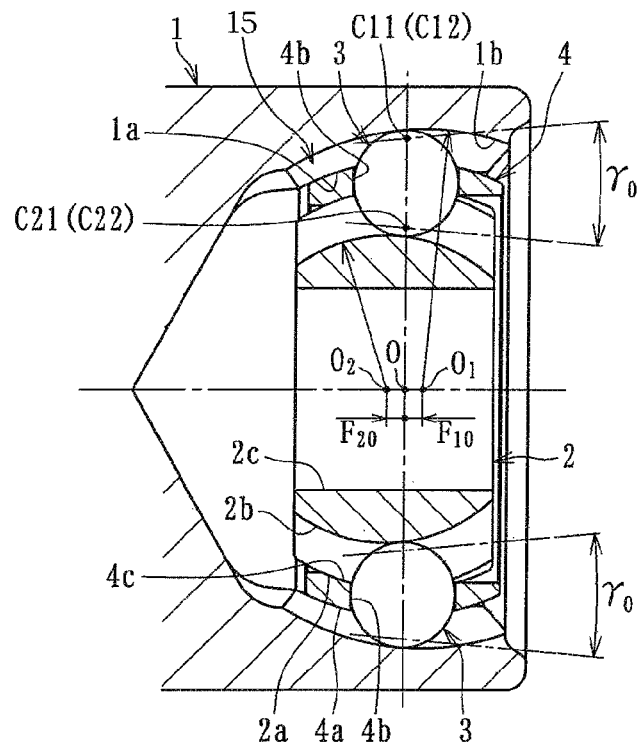
FIG. 1 is a vertical cross-sectional view of a fixed-type constant velocity universal joint of the present invention.
Figure 2:
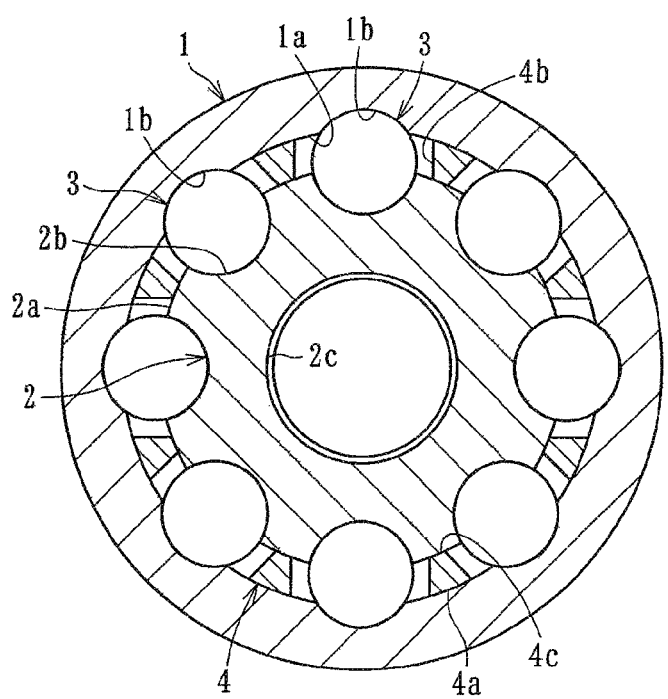
FIG. 2 is a horizontal cross-sectional view of the fixed-type constant velocity universal joint.
Figure 3:
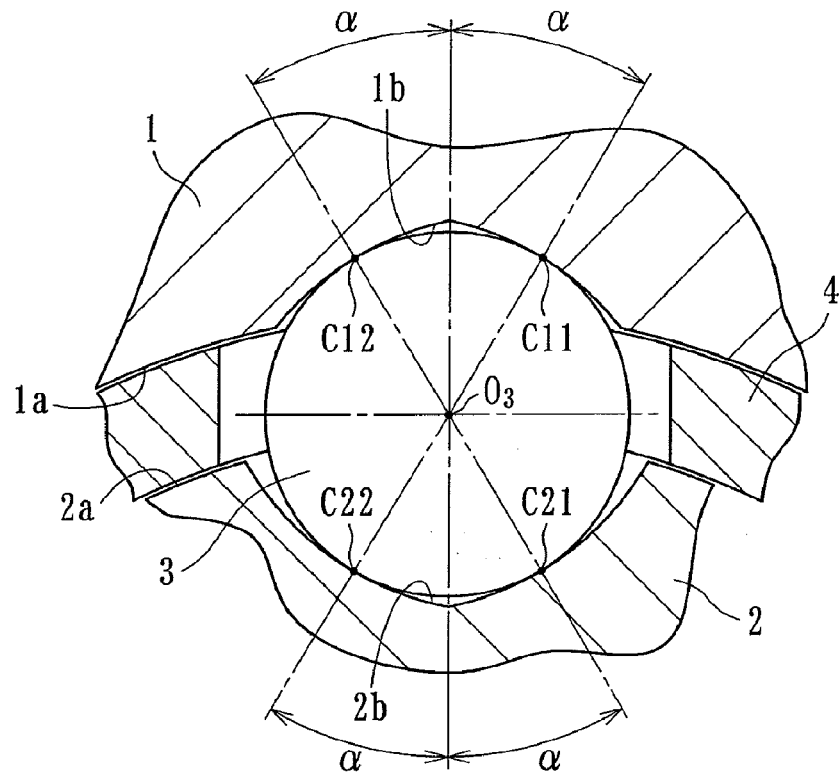
FIG. 3 is an enlarged horizontal cross-sectional view of main sections in FIG. 2.

An embodiment of the present invention will be described below with reference to FIG. 1 to FIG. 3. FIG. 1 is a vertical cross-sectional view of a fixed-type constant velocity universal joint of the present invention taken along a plane that is parallel with an axial line. FIG. 2 is a horizontal cross-sectional view taken along a plane that is perpendicular to the axial line. FIG. 3 is a diagram of main sections in FIG. 2.

Main constituent elements of the fixed-type constant velocity universal joint of the present invention include an outer joint member 1, an inner joint member 2 provided within the outer joint member 1, eight torque transmitting balls 3 interposed between the outer joint member 1 and the inner joint member 2, and a cage 4 that holds the eight torque transmitting balls 3.

The outer joint member 1 is connected to one of two shafts, a driving shaft and a driven shaft, that intersect with each other (not shown). An inner circumferential surface 1a of the outer joint member 1 is formed into a spherical shape. Eight guide grooves 1b that extend in an axial direction are formed on the spherical inner circumferential surface 1a, evenly spaced in the circumferential direction. The interior of the outer joint member 1 is filled with a lubricant 15. The lubricant is sealed from outside exposure by a bellows-shaped boot or the like attached to an opening end of the outer joint member 1 (not shown).

An outer circumferential surface 2a of the inner joint member 2 is formed into a spherical shape. Eight guide grooves 2b that extend in the axial direction are formed on the spherical outer circumferential surface 2a, evenly spaced in the circumferential direction. A spline or a serration is formed on an inner circumferential surface 2c of the inner joint member 2 to allow the other of the two shafts (not shown) to be inserted and engaged.

An outer circumferential surface 4a and an inner circumferential surface 4c of the cage 4 are both formed into a spherical shape. The cage 4 has eight pockets 4b formed such as to penetrate the cage 8, evenly spaced in the circumferential direction. The spherical inner circumferential surface 1a of the outer joint member 1, the spherical outer circumferential surface 2a of the inner joint member 2, and the outer circumferential surface 4a and the inner circumferential surface 4b of the cage 4 are all concentric spherical surfaces, the center of which is a joint center O. Spherical inner and outer circumferential surfaces that oppose each other are in spherical contact with each other.

A torque transmitting ball 3 is housed in each pocket 4b of the cage 4. The torque transmitting balls 3 are disposed on ball tracks formed by each guide groove 1b of the outer joint member 1 and guide groove 2b of the inner joint member 2 opposing each other.

Figure 14:
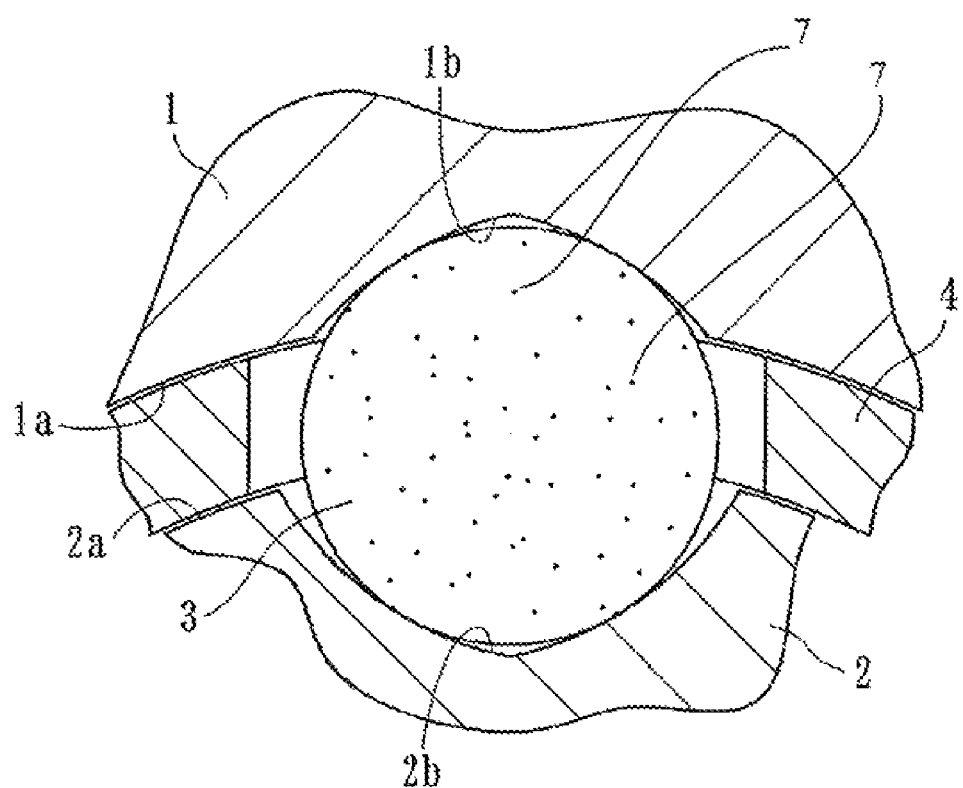
FIG. 14 is an enlarged view of a torque transmitting ball showing numerous miniscule recesses.

Numerous miniscule recesses 7 are randomly formed on the surface of the torque transmitting ball 3, as shown in FIG. 14. A minimum surface roughness (arithmetic mean roughness) of the surface of the ball 3 is preferably set to Ra 0.03 μm. A maximum surface roughness is preferably set to Ra 0.6 μm. The minimum surface roughness of the ball 3 is more preferably Ra 0.05 μm. The maximum surface roughness is more preferably Ra 0.15 μm. A minimum percentage of a total area of the numerous miniscule recesses 7 to a surface area of the ball 3 is preferably 10%. A maximum percentage is preferably 40%.

A maximum parameter SK value of the surface roughness of the ball 3 is preferably set to −1.0. A minimum parameter SK value is preferably set to −4.9. Here, the SK value refers to skewness of a distribution curve of the surface roughness. In other words, the SK value indicates relativity of an amplitude distribution curve of recesses and projections to an average line of surface roughness. The SK value of the surface roughness is expressed by a following expression:

$$SK = \int (x-x_0)^3 \cdot P(x) dx / \sigma^3$$

where, x indicates a height of the roughness, $x_0$ indicates an average height of the roughness, P(x) indicates a probability density function of the amplitude of the roughness, and σ indicates a mean-squared roughness.

The parameter SK value is positive when, in relation to the average line of the surface roughness, there are more peaks in the amplitude distribution curve. The parameter SK value is zero when, in relation to the average line of the surface roughness, the valleys and peaks in the amplitude distribution curve are equal. The parameter SK value is negative when, in relation to the average line of the surface roughness, there are more valleys in the amplitude distribution curve. Therefore, the parameter SK value of the surface roughness of the ball 3 on which the numerous miniscule recesses are formed is a negative value.

Figure 13:
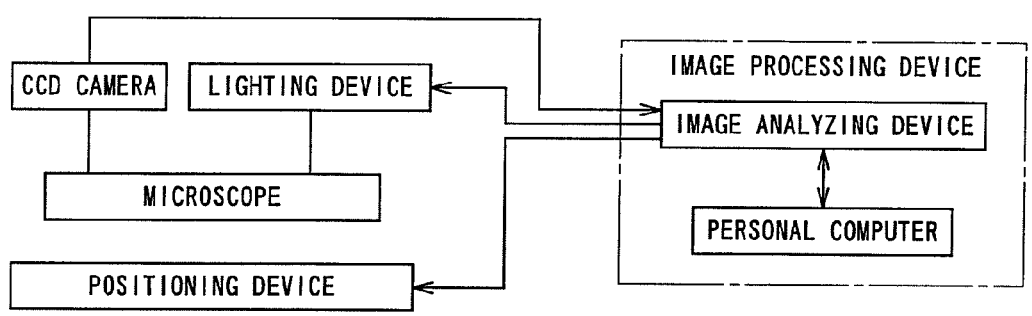
FIG. 13 is a schematic diagram of a measuring device that quantitatively measures the miniscule recesses formed on the ball.

The above-described numerical limits of the SK value and the surface roughness Ra of the surface of the ball 3, and the above-described numerical limits of the percentage of the total area of the numerous miniscule recesses serve as an effective range for forming a lubricant film layer on the surface of the ball 3. The roughness Ra, the SK value, and the percentage of the total area of the miniscule recesses are measured in six areas of the ball surface that are separated by about 90 degrees. Evaluation and judgment are performed using the mean values of the measurements. The above-mentioned effective range is also judged based on this method. Quantitative measurement of the miniscule recesses is performed by a device configuration shown in FIG. 13. A method of reading the measurement is as follows. The ball is placed on a positioning device. The ball surface is magnified under a microscope. A charge-coupled device (CCD) camera loads an image into an image processing device that includes an image analyzing device and a personal computer. Analysis is performed with white portions of the image as flat surface areas, and black portions of the image as the recesses. With the black portions of the image as the recesses, size and distribution are calculated. A surface area percentage of the black portions is determined and evaluated. Details of a surface analysis method can be found in a method described in Japanese Patent Laid-open Publication No. 2001-183124.

The surface roughness and the SK value are measured by a measuring instrument Form Talysurf (manufactured by Taylor Hobson). As measurement conditions, cut-off type is Gaussian, measurement length is 5λ, cut-off number is 6, cut-off wavelength is 0.25 mm, measurement magnification is 10,000 times, and measurement speed is 0.30 mm/s. As a method of forming the numerous miniscule recesses on the surface of the ball 3, for example, a special barrel finishing treatment is known. Alternatively, surface processing can also be performed by shot-blast treatment and the like.

FIG. 3 is a diagram of main sections in FIG. 2. More specifically, FIG. 3 is a horizontal cross-sectional view of the opposing guide groove 1b of the outer joint member 1 and guide groove 2b of the inner joint member 2. As shown in FIG. 3, the guide groove 1b of the outer joint member 1 and the guide groove 2b of the inner joint member 2 are both formed into Gothic arches. Therefore, the ball 3 comes into contact (angular contact) with the guide groove 1b of the outer joint member 1 at two points, C11 and C 12. The ball 3 also comes into contact (angular contact) with the guide groove 2b of the inner joint member 2 at two points, C21 and C22. Angles α formed by straight lines passing through the ball center $O_3$, and each contact point C11, C12, C21, and C22 and a straight line passing through the ball center $O_3$ and the joint center O are contact angles. The contact angle α of each contact point C11, C12, C21, and C22 is the same. A minimum contact angle α is preferably set to 30 degrees. A maximum contact angle α is preferably set to 38 degrees. The eight-ball joint according to the embodiment is formed having a smaller ball diameter than that of the conventional six-ball joint. As a result of each guide groove 1b and guide groove 2b being in contact with the ball 3 as described above, the contact pressure between each guide groove 1b and guide groove 2b, and the ball 3 can be reduced. Durability that is equal to or greater than that of the conventional joint can be achieved.

As shown in the vertical cross-sectional view in FIG. 1, the opposing guide grooves 1b and 2b are each formed into an arc shape. The respective center of curvatures $O_1$ and $O_2$ of the guide grooves 1b and 2b are at positions offset from the joint center O by an equal distance ($F_{10}$ and $F_{20}$) in opposite directions in the axial direction. As a result of the center of curvatures $O_1$ and $O_2$ being offset in this way, the ball track formed by opposing guide grooves 1b and 2b is formed into a wedge shape that gradually widens towards one axial direction. In this instance, the ball track widens towards the opening end of the outer joint member 1. Then, when the outer joint member 1 and the inner joint member 2 are angularly displaced by an arbitrary operating angle θ, the ball 3 guided to the cage 4 is maintained on a plane perpendicular to a bisecting line of the operating angle θ. Therefore, constant speed of the joint is ensured.

Figure 8A:
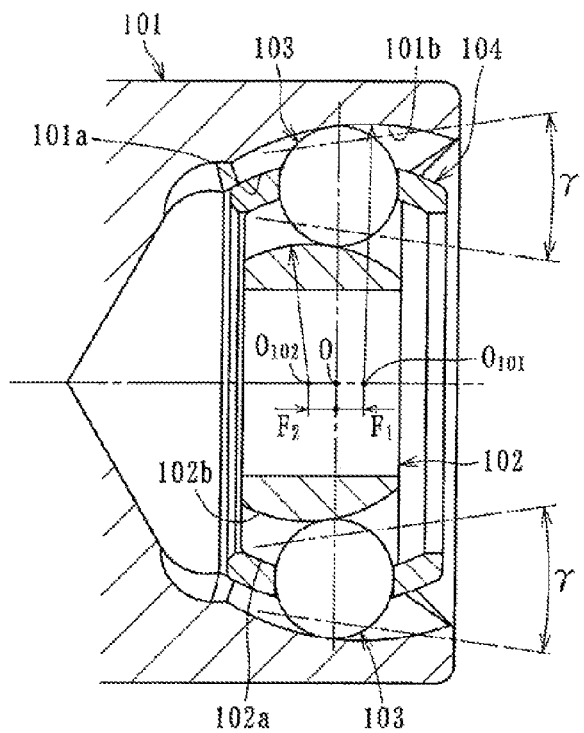
FIG. 8A and FIG. 8B are diagrams of a conventional six-ball fixed-type constant velocity universal joint, FIG. 8A being a vertical cross-sectional view and FIG. 8B being an enlarged vertical cross-sectional view of main sections in FIG. 8A.
Figure 8B:
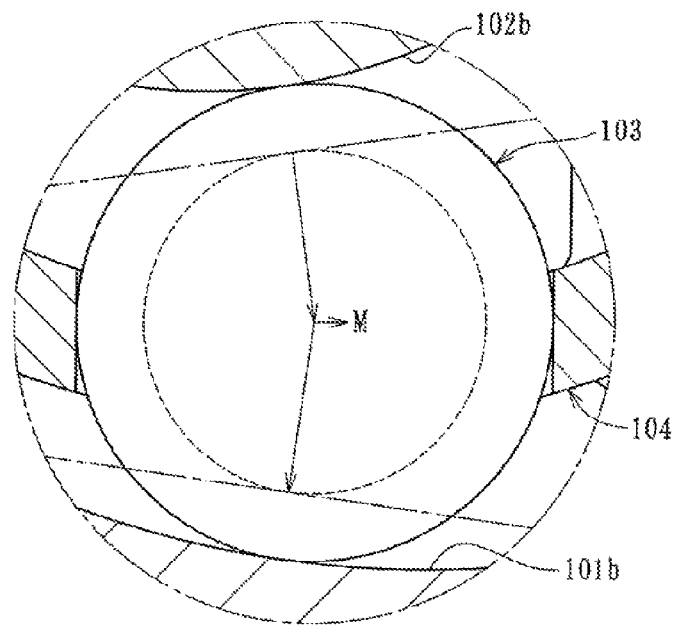
Figure 9A:
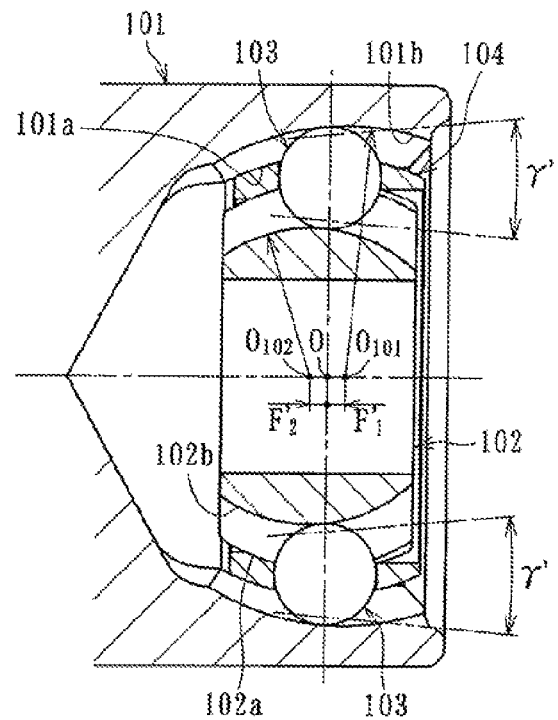
FIG. 9A and FIG. 9B are diagrams of a conventional eight-ball fixed-type constant velocity universal joint, FIG. 9A being a vertical cross-sectional view and FIG. 9B being an enlarged vertical cross-sectional view of main sections in FIG. 9A.
Figure 9B:
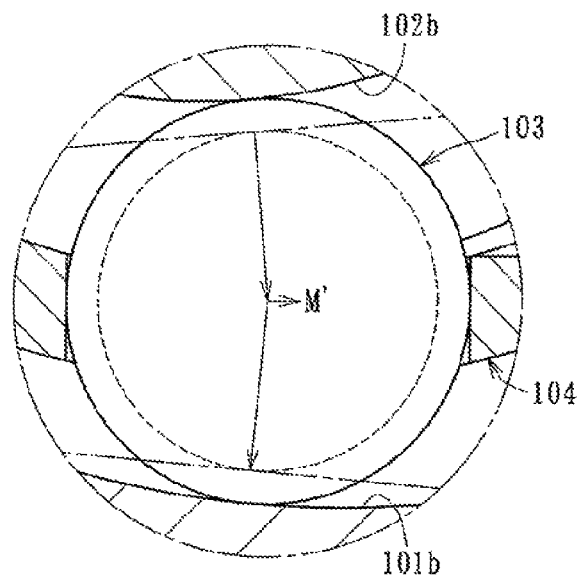
Figure 10:
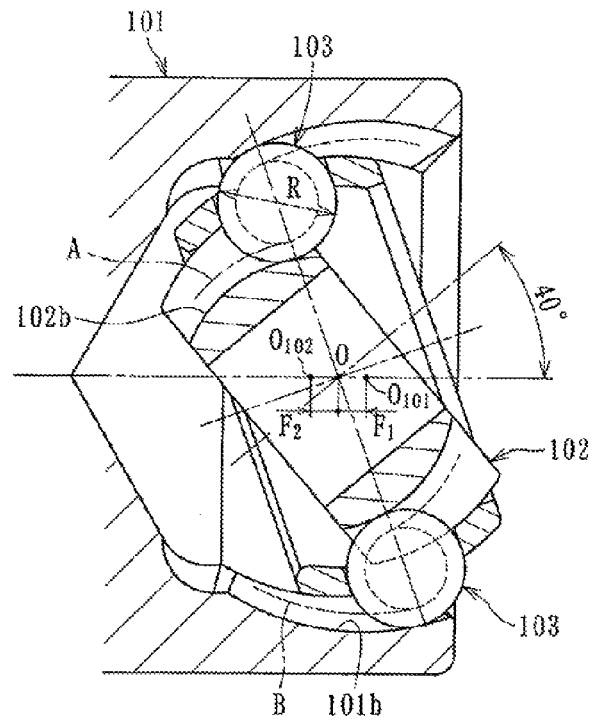
FIG. 10 is a vertical cross-sectional view of when the conventional six-ball fixed-type constant velocity universal joint is at an operating angle.
Figure 11:
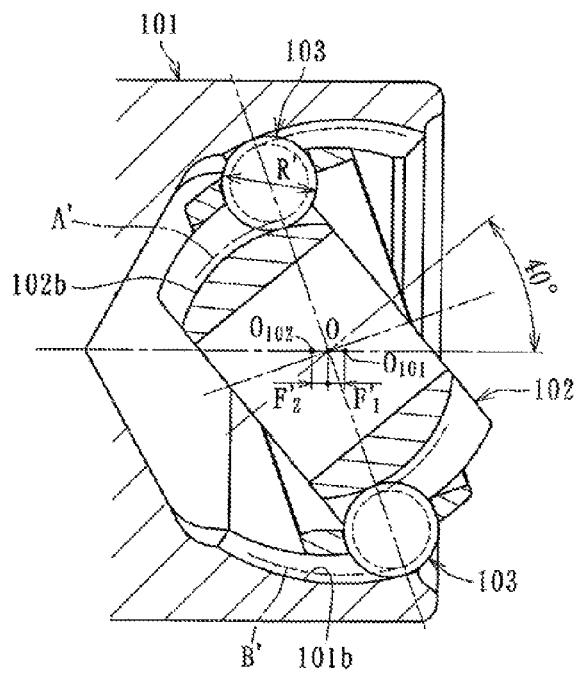
FIG. 11 is a vertical cross-sectional view of when the conventional eight-ball fixed-type constant velocity universal joint is at an operating angle.

An angle formed by two tangential lines in the axial direction at the contact points (C11 and C22 or C12 and C21) of the ball 3 in relation to the opposing guide grooves 1b and 2b is referred to as an angle of nip $\gamma_0$. The minimum angle of nip $\gamma_0$ is preferably set to 8.5 degrees. The maximum angle of nip $\gamma_0$ is preferably set to 12.5 degrees. As a result of the angle of nip $\gamma_0$ being set to this range, thrust force in the axial direction generated on the ball 3 (refer to FIG. 8B or FIG. 9B) can be reduced such as to be within an effective range.

Figure 4:
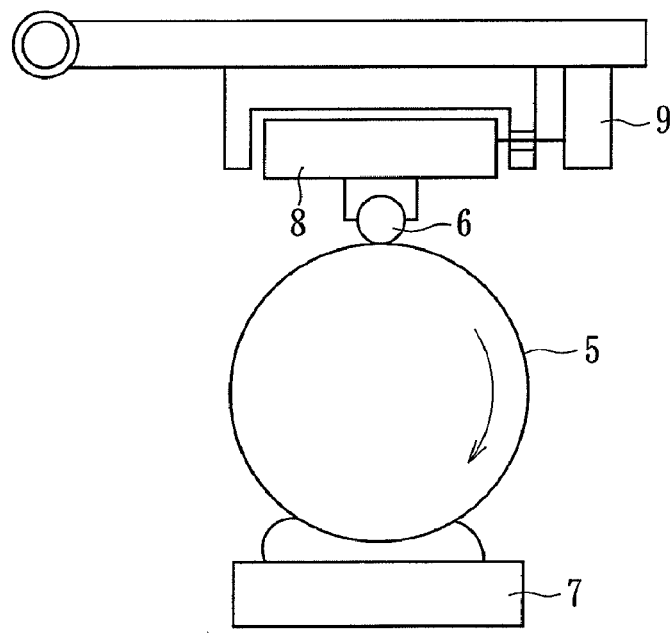
FIG. 4 is a schematic diagram of a Savan-type friction and wear tester.

A lubricant having a low coefficient of friction is preferably used as the lubricant. For example, a lubricant having a maximum coefficient of friction of 0.07, measured using a Savan-type friction and wear tester, is preferred. Here, as shown in FIG. 4, the Savan-type friction and wear tester is configured by a ¼-inch steel ball 6 pressed against a rotating ring 5 having a diameter of 40 mm and a thickness of 4 mm. To measure the coefficient of friction, the rotating ring 5 rotates at a peripheral speed of 108 m/min, and a load of 12.7N is applied. The lubricant is supplied to the surface of the rotating ring 5 from the bottom end of the rotating ring 5 by a sponge 7. A load cell 9 detects movement of an air-slide 8 that holds the steel ball 6, and the coefficient of friction is measured. A specific example of the lubricant is urea grease. The consistency of the urea grease is preferably a minimum of No. 0 and a maximum of No. 2.

Even when pressure is applied between the ball 3 and the guide grooves 1b and 2b during joint rotation, the lubricant that has permeated into the numerous miniscule recesses on the ball 3 surface is interposed between the contact interfaces of the ball 3 and the guide grooves 1b and 2b, forming a suitable lubricant film layer.

Figure 5:
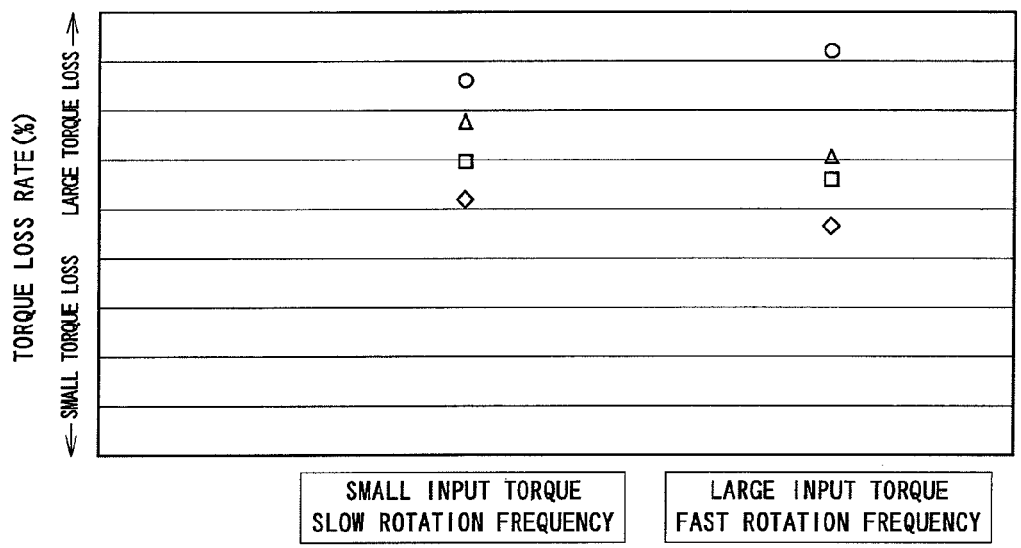
FIG. 5 is a graph showing respective torque loss rates of when a lubricant having a low coefficient of friction is used and of a comparison example.

FIG. 5 is a graph indicating a relationship between the coefficient of friction of the lubricant used in the fixed-type constant velocity universal joint and torque loss rate at this time, Four types of lubricants, each having a different coefficient of friction, were used. Torque loss was measured for each lubricant, under two sets of conditions: when input torque of the joint is small and rotation frequency is slow; and when input torque is large and rotation frequency is fast. Regarding symbols plotted on the graph, a circle indicates a lubricant with a coefficient of friction of about 0.1. Other symbols, such as a triangle, a square, and a diamond, indicate lubricants with a coefficient of friction of 0.07 or less. The graph in FIG. 5 clearly indicates that when a lubricant having a coefficient of friction of 0.07 or less is used, the torque loss rate decreases compared to when the lubricant having the coefficient of friction of about 0.1 is used. In other words, torque transmission efficiency improves.

Figure 6:
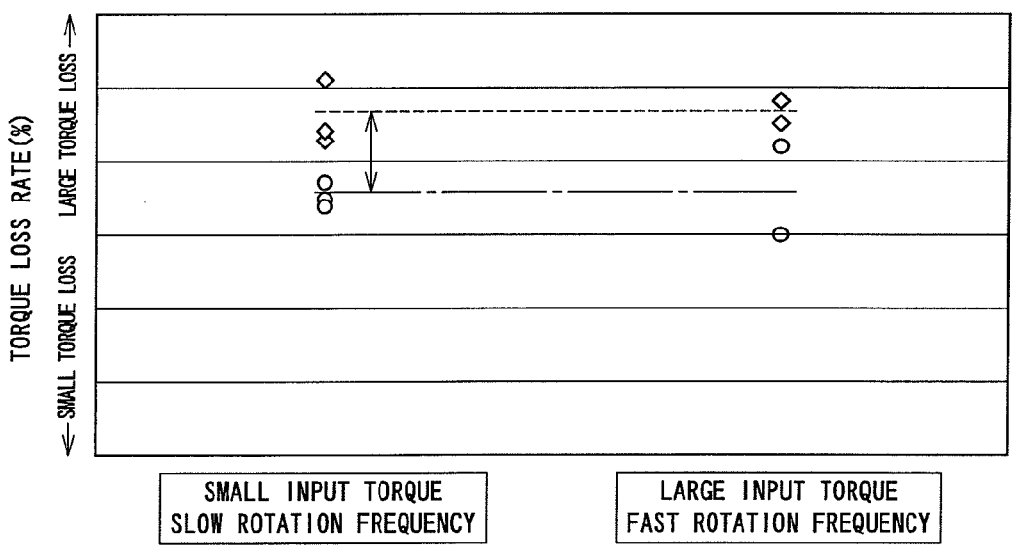
FIG. 6 is a graph showing respective torque loss rates of when a ball on which numerous miniscule recesses are formed is used and of the comparison example.

FIG. 6 is a graph comparing torque loss rates between a joint having a ball with a surface on which numerous miniscule recesses are formed (the joint of the present invention) and a joint having a ball with no miniscule recesses (a comparison example joint). In this instance as well, the torque loss rate was measured for each joint, under two sets of conditions: when input torque of the joint is small and rotation frequency is slow; and when input torque is large and rotation frequency is fast. The joint of the present invention and the comparison example joint were both filled with a lubricant having the same coefficient of friction. A circle shown on the graph in FIG. 6 indicates test data of the joint of the present invention. A diamond indicates test data of the comparison example joint. A dashed line indicates an average line of each piece of data of the present invention. A dotted line indicates an average line of each piece of data of the comparison example. The difference between the two average lines clearly indicates that the torque loss rate is reduced in the present invention, compared to the comparison example. Torque transmission efficiency is improved.

Figure 7:
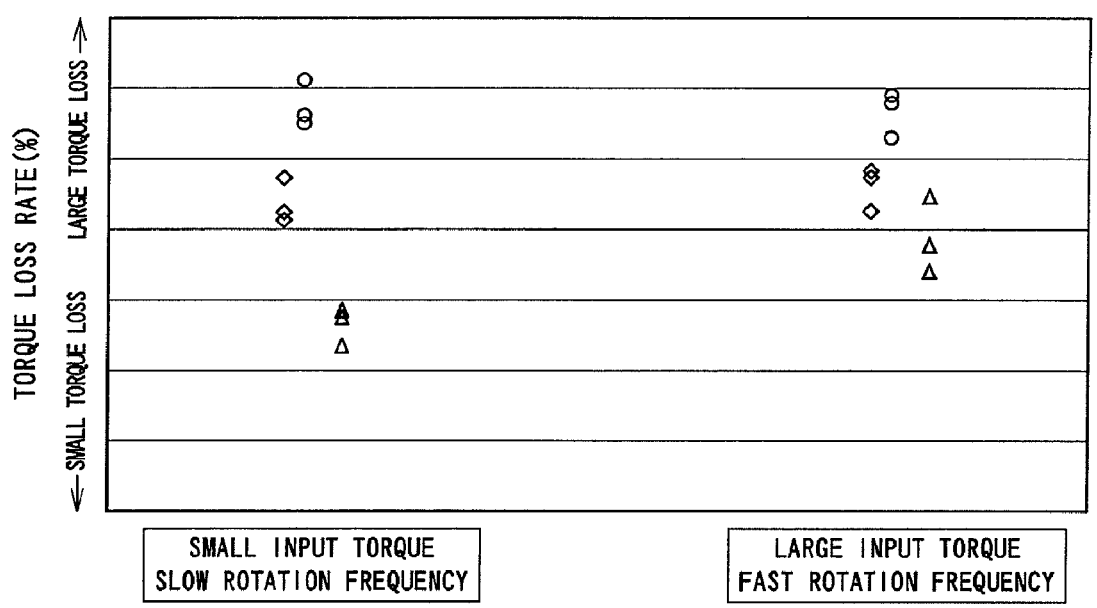
FIG. 7 is a graph showing respective torque loss rates of when the lubricant having a low coefficient of friction and the ball on which numerous miniscule recesses are formed are used in combination and of the comparison example.

FIG. 7 is a graph indicating the respective torque loss rates of a joint (the joint of the present invention) using a lubricant having a coefficient of friction that is 0.07 or less and having a ball on which numerous miniscule recesses are formed, and a joint (a comparison example joint) using a lubricant having a coefficient of friction that is about 0.1 and having a ball on which no miniscule recesses are formed. In this instance as well, the torque loss rate was measured under two sets of conditions: when input torque of the joint is small and rotation frequency is slow; and when input torque is large and rotation frequency is fast. In FIG. 7, a circle indicates data of the comparison example. A triangle indicates data of the present invention. A diamond indicates a predicted value obtained when the test result of the present invention was predicted based on the test results in FIG. 5 and FIG. 6. The results in FIG. 7 clearly indicate that the torque loss rate is reduced in the present invention, compared to the comparison example. Moreover, an actual measurement value (triangle) of when a lubricant having a low coefficient of friction (coefficient of friction of 0.07 or less) and a ball on which numerous miniscule recesses are formed are used in combination shows a lower torque loss rate than the predicted measurement value (diamond) estimated from results of when a lubricant having a low coefficient of friction (coefficient of friction of 0.07 or less) and a ball on which numerous miniscule recesses are formed are used individually. It is clear that the advantageous effect on torque transmission efficiency is further enhanced by combined use of both the lubricant having a low coefficient of friction (coefficient of friction of 0.07 or less) and the ball on which the numerous miniscule recesses are formed.

Figure 12A:
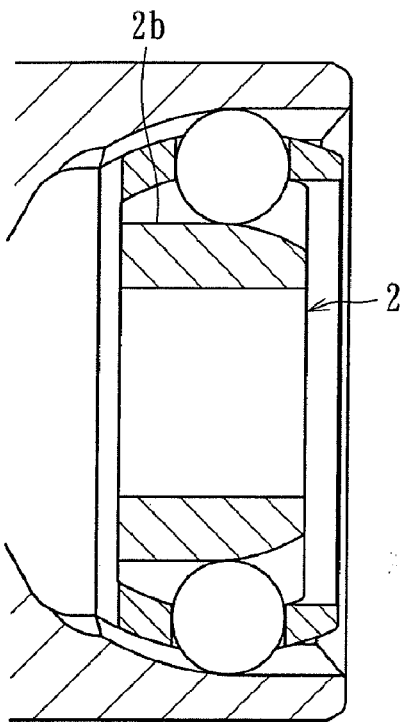
FIG. 12A and FIG. 12B are diagrams of a fixed-constant velocity universal joint on which a guide groove having a straight bottom that is parallel with an axial direction is formed, FIG. 12A being a vertical cross-sectional view, and FIG. 12B being a horizontal cross-sectional view.
Figure 12B:
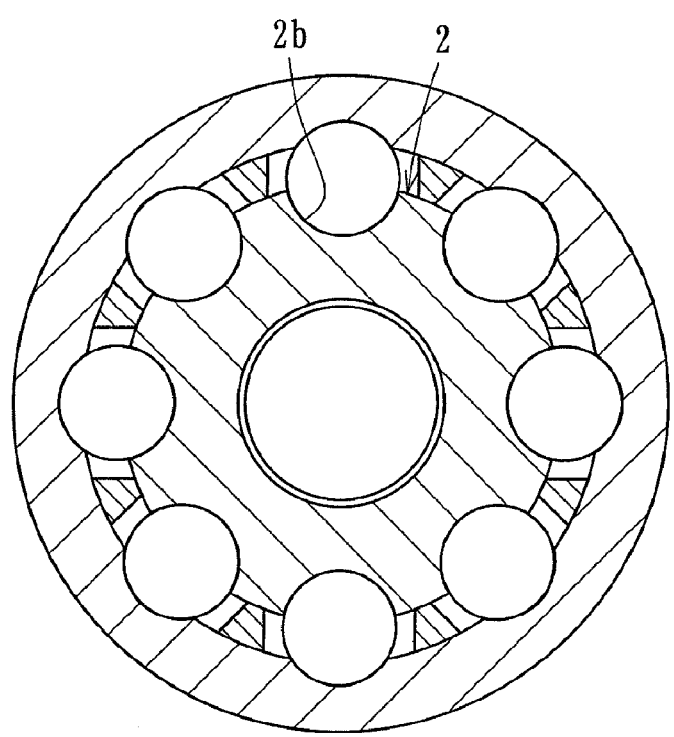

An embodiment of the present invention is described above. However, the present invention is not limited to the above-described embodiment. Various modifications can be made without departing from the scope of the present invention. For example, numerous miniscule recesses can be formed on the guide grooves 1b and 2b to interpose the lubricant between the contact interfaces of the ball 3 and the guide grooves 1b and 2b. The present invention can also clearly be applied to a fixed-type constant velocity universal joint (UF type) in which a guide groove 2b having a straight bottom parallel with the axial direction is formed, as shown in FIG. 12.

The invention claimed is:

1. A fixed-type constant velocity universal joint comprising:
   an outer joint member that is filled with a lubricant and on which a guide groove that extends in an axial direction is formed on a spherical inner circumferential surface;
   an inner joint member provided on an inner diameter side of the outer joint member and on which a guide groove that extends in the axial direction is formed on a spherical outer circumferential surface;
   a torque transmitting ball interposed between opposing guide grooves of the outer joint member and the inner joint member so as to roll freely; and
   a cage that holds the ball,
   wherein numerous miniscule recesses are randomly formed on a surface of the ball,
   wherein a maximum coefficient of friction of the ball is 0.07 as measured by a Savan-type friction and wear tester with the lubricant,
   wherein a minimum surface roughness of the ball on which the numerous miniscule recesses are formed is set to Ra 0.03 μm, a maximum surface roughness is set to Ra 0.6 μm,
   wherein a maximum parameter SK value of the surface roughness of the ball is set to −1.0, the SK value being defined as follows:

$$SK = \int (x-x_0)^3 \cdot P(x) dx / \sigma^3$$

wherein x indicates a height of the roughness, $x_o$ indicates an average height of the roughness, P(x) indicates a probability density function of the amplitude of the roughness, and σ indicates a mean-squared roughness, and
   wherein a minimum percentage of a total area of the numerous miniscule recesses to a surface area of the ball is set to 10%, and a maximum percentage of the total area of the numerous miniscule recesses to the surface area of the ball is set to 40%.

2. The fixed-type constant velocity universal joint according to claim 1, wherein eight guide grooves are formed on each of the outer joint member and the inner joint member,
   wherein eight torque transmitting balls are each interposed between opposing guide grooves of the outer joint member and the inner joint member so as to roll freely, and
   wherein each ball is in angular contact at two points with the respective guide groove of the outer joint member, and is in angular contact at two points with the respective guide groove of the inner joint member.

3. A fixed-type constant velocity universal joint comprising:
   an outer joint member that is filled with a lubricant and on which a guide groove that extends in an axial direction is formed on a spherical inner circumferential surface;
   an inner joint member provided on an inner diameter side of the outer joint member and on which a guide groove that extends in the axial direction is formed on a spherical outer circumferential surface;
   a torque transmitting ball interposed between opposing guide grooves of the outer joint member and the inner joint member so as to roll freely; and
   a cage that holds the ball,
   wherein numerous miniscule recesses are randomly formed on a surface of the ball, and wherein a maximum coefficient of friction of the ball is 0.07 as measured by a Savan-type friction and wear tester with the lubricant,
   wherein eight guide grooves are formed on each of the outer joint member and the inner joint member,
   wherein eight torque transmitting balls are each interposed between opposing guide grooves of the outer joint member and the inner joint member so as to roll freely,
   wherein each ball is in angular contact at two points with the respective guide groove of the outer joint member, and is in angular contact at two points with the respective guide groove of the inner joint member,
   wherein for each ball a minimum contact angle is set to 30 degrees and a maximum contact angle is set to 38 degrees, the contact angle being formed by a straight line passing through a contact point between the ball and the guide groove of the outer joint member and the guide groove of the inner joint member, and a ball center, and a straight line passing through the ball center and a joint center, and wherein for each ball a minimum angle of nip is set to 8.5 degrees and a maximum angle of nip is set to 12.5 degrees, the angle of nip being formed by two tangential lines in the axial direction at each contact point between the opposing guide grooves of the outer joint member and the inner joint member and the ball.

4. A fixed-type constant velocity universal joint comprising:

an outer joint member that is filled with a lubricant and on which a guide groove that extends in an axial direction is formed on a spherical inner circumferential surface;

an inner joint member provided on an inner diameter side of the outer joint member and on which a guide groove that extends in the axial direction is formed on a spherical outer circumferential surface;

a torque transmitting ball interposed between opposing guide grooves of the outer joint member and the inner joint member so as to roll freely; and a cage that holds the ball, wherein numerous miniscule recesses are randomly formed on a surface of the ball, and wherein a maximum coefficient of friction of the ball is 0.07 as measured by a Savan-type friction and wear tester with the lubricant, wherein a minimum surface roughness of the ball on which the numerous miniscule recesses are formed is set to Ra 0.05 μm, a maximum surface roughness is set to Ra 0.15 μm, wherein a minimum parameter SK value is set to −4.9, and a maximum parameter SK value of the surface roughness of the ball is set to −1.0, the SK value being defined as follows:

$$SK = \int (x-x_0)^3 \cdot P(x) dx / \theta^3$$

wherein x indicates a height of the roughness, $x_0$ indicates an average height of the roughness, $P(x)$ indicates a probability density function of the amplitude of the roughness, and σ indicates a mean-squared roughness, and wherein a minimum percentage of a total area of the numerous miniscule recesses to a surface area of the ball is set to 10%, and a maximum percentage of the total area of the numerous miniscule recesses to the surface area of the ball is set to 40%.

5. The fixed-type constant velocity universal joint according to claim 4, wherein eight guide grooves are formed on each of the outer joint member and the inner joint member, wherein eight torque transmitting balls are each interposed between opposing guide grooves of the outer joint member and the inner joint member so as to roll freely, and wherein each ball is in angular contact at two points with the respective guide groove of the outer joint member, and is in angular contact at two points with the respective guide groove of the inner joint member.

6. The fixed-type constant velocity universal joint according to claim 4, wherein for each ball a minimum contact angle is set to 30 degrees and a maximum contact angle is set to 38 degrees, the contact angle being formed by a straight line passing through a contact point between the ball and the guide groove of the outer joint member and the guide groove of the inner joint member, and a ball center, and a straight line passing through the ball center and a joint center, and wherein for each ball a minimum angle of nip is set to 8.5 degrees and a maximum angle of nip is set to 12.5 degrees, the angle of nip being formed by two tangential lines in the axial direction at each contact point between the opposing guide grooves of the outer joint member and the inner joint member and the ball.

* * * * *